(12) United States Patent
Deng et al.

(10) Patent No.: US 12,542,719 B2
(45) Date of Patent: Feb. 3, 2026

(54) SERVER LOAD PREDICTION METHOD BASED ON DEEP LEARNING

(71) Applicants: ZHEJIANG UNIVERSITY, Hangzhou (CN); ZHEJIANG UNIVERSITY ZHONGYUAN INSTITUTE, Zhengzhou (CN)

(72) Inventors: Shuiguang Deng, Hangzhou (CN); Feiyi Chen, Hangzhou (CN); Hailiang Zhao, Hangzhou (CN)

(73) Assignees: ZHEJIANG UNIVERSITY, Hangzhou (CN); ZHEJIANG UNIVERSITY ZHONGYUAN INSTITUTE, Zhengzhou (CN)

( * ) Notice: Subject to any disclaimer, the term of this patent is extended or adjusted under 35 U.S.C. 154(b) by 343 days.

(21) Appl. No.: 18/281,770

(22) PCT Filed: Mar. 17, 2023

(86) PCT No.: PCT/CN2023/082143
§ 371 (c)(1),
(2) Date: Sep. 12, 2023

(87) PCT Pub. No.: WO2024/040947
PCT Pub. Date: Feb. 29, 2024

(65) Prior Publication Data
US 2025/0030610 A1    Jan. 23, 2025

(30) Foreign Application Priority Data

Aug. 23, 2022 (CN) .......................... 202211013582.8

(51) Int. Cl.
*H04L 41/16* (2022.01)
*G06N 3/0442* (2023.01)
(Continued)

(52) U.S. Cl.
CPC .......... *H04L 41/16* (2013.01); *G06N 3/0442* (2023.01); *G06N 3/084* (2013.01); *H04L 43/0817* (2013.01)

(58) Field of Classification Search
CPC . H04L 41/16; H04L 43/0817; H04L 67/1008; H04L 67/1012; G06N 3/0442;
(Continued)

(56) References Cited

U.S. PATENT DOCUMENTS

| | | | |
|---|---|---|---|
| 11,341,019 B2* | 5/2022 | Toledano | G06F 11/3447 |
| 2020/0118039 A1 | 4/2020 | Kocberber et al. | |
| 2023/0244947 A1* | 8/2023 | Woo | G06N 3/045 |
| | | | 706/21 |

FOREIGN PATENT DOCUMENTS

| | | |
|---|---|---|
| CN | 113553150 | 10/2021 |
| CN | 113626177 | 11/2021 |

(Continued)

*Primary Examiner* — Michael A Keller
(74) *Attorney, Agent, or Firm* — Jiwen Chen; Joywin IP Law PLLC

(57) ABSTRACT

The present invention discloses a server load prediction method based on deep learning, collecting the trend change of server load long series, and utilizing server load periodic information to establish a deep neural network prediction model to optimize peak load prediction. The present invention provides a method for improving the accuracy of neural network prediction by combining periodic information, long-term trend information, and short-term time series information, and demonstrates superiority over traditional methods in the peak load section. The method of the present invention can effectively improve prediction accuracy, provide more accurate scheduling and evacuation decision-making basis for cloud service providers, thereby reducing the redundant equipment required to ensure high reliability, reducing the operating costs of cloud service providers, and reducing the rental expenses of cloud service tenants.

2 Claims, 2 Drawing Sheets

(51) Int. Cl.
  *G06N 3/084* (2023.01)
  *H04L 43/0817* (2022.01)
(58) Field of Classification Search
  CPC ........ G06N 3/084; G06N 3/044; G06N 3/045; G06N 3/08; G06N 3/049
  See application file for complete search history.

(56) References Cited

FOREIGN PATENT DOCUMENTS

| | | |
|---|---|---|
| CN | 114490065 | 5/2022 |
| CN | 114528097 | 5/2022 |

* cited by examiner

SERVER LOAD PREDICTION METHOD BASED ON DEEP LEARNING

This is a U.S. national stage application of PCT Application No. PCT/CN2023/082143 under 35 U.S.C. 371, filed Mar. 17, 2023 in Chinese, claiming priority of Chinese Application No. 202211013582.8, filed Aug. 23, 2022, all of which are hereby incorporated by reference.

TECHNICAL FIELD

The present invention belongs to the field of cloud computing technology, and specifically relates to a server load prediction method based on deep learning.

DESCRIPTION OF RELATED ART

Cloud service providers provide scalable on-demand services for most ordinary application developers, providing convenience for application development and reducing server maintenance costs for ordinary developers. Therefore, cloud computing has boomed in recent years with the development of the Internet, and a large number of cloud service providers have emerged, Amazon and Alibaba Cloud can provide cloud service with reliability of up to 99.65%.

However, in order to meet the high reliability requirements of cloud service, a large number of redundant computing resources need to be preset. According to statistics, the average CPU usages of Google clusters is less than 35%, while the CPU usages of 60% of virtual machines in Microsoft clusters is less than 20%.

Based on the above observations, the reference [Jiang, Y., et al. "Burstable Instances for Clouds: Performance Modeling, Equilibrium Analysis, and Revenue Maximization." *IEEE INFOCOM* 2019-*IEEE Conference on Computer Communications* (*INFOCOM* '19) IEEE, 2019] proposes that task optimization combinations can be utilized through time division multiplexing to improve server usages and reduce cloud service provider costs while ensuring reliability, and reduce cloud service rental fees.

In order to achieve time division multiplexing of server resources, it is necessary to accurately predict the server load and provide basis for decision-making for task combination, scheduling, and evacuation. The reference [Chen Z, Hu J, Min G, et al. Towards Accurate Prediction for High-Dimensional and Highly-Variable Cloud Workloads with Deep Learning [J]. IEEE Transactions on Parallel and Distributed Systems, 2019] pointed out that server load has the characteristic of drastic changes. In time series with drastic changes, the current proposed model has unsatisfactory predictive performance at the peak of the series; in the background of time division multiplexing, inaccurate peak prediction is more likely to cause service defaults, causing cloud service providers to pay huge liquidated damages.

SUMMARY OF THE INVENTION

In view of the above, the present invention provides a server load prediction method based on deep learning, collecting the trend change of server load long series, and utilizing server load periodic information to establish a deep neural network prediction model to optimize peak load prediction.

A server load prediction method based on deep learning, comprising the following steps:

(1) collecting a load usages series of the server in a past period of time and dividing it into a sample series and a label series;
(2) extracting periodic information of the load usages series;
(3) establishing a periodic information adaptive model based on encoder-decoder architecture;
(4) inputting the sample series, the label series, and the periodic information into the model for training;
(5) inputting the load usages series of the server in the current time segment into the trained model, the load usages series of the server in the future time segment can be predicted and output.

Furthermore, the server load targets the CPU or memory resources of the server.

Furthermore, a specific implementation method of step (1) is as follows: dividing the load usages series of the server in the past period of time into two segments, with the load usages series of the previous time segment as the sample series and the load usages series of the later time segment as the label series, and the data proportion of the previous time segment is greater than that of the later time segment.

Furthermore, a specific implementation method of step (2) is as follows: for the load usages series of the server in the past period of time segment, an autocorrelation coefficient signal of the series is first calculated, and an abscissa value corresponding to the second peak of the autocorrelation coefficient signal is taken as a period length T, and the abscissa value represents the time interval length; then, taking the load usages series of the T time length before the label sequence as the periodic information.

Furthermore, the periodic information adaptive model is comprised of an encoder module connected with a decoder module, the encoder module comprises a downsampling layer, a multi-headed self-attention mechanism layer, and a LSTM (Long Short Term Memory, Long short-term memory Network) layer L1, the decoder module comprises a LSTM layer L2 and three attention mechanism layers A1~A3.

Furthermore, a specific implementation method of step (4) is as follows: first, dividing the sample series into two segments with the front segment series being longer than the back segment series, inputting the front segment series into the downsampling layer for downsampling, and inputting the downsampling result into the multi-headed self-attention mechanism layer; inputting the back segment series into the LSTM layer L1, inputting the hidden state of the LSTM layer L1 into the attention mechanism layer A1 as a query, and using the output of the multi-headed self-attention mechanism layer as the key and value pair of the attention mechanism layer A1, the output of the attention mechanism layer A1 is used as the initial hidden state of the LSTM layer L2, and the output of the LSTM layer L1 is used as the input of the LSTM layer L2; the decoder module needs to input the previous hidden state of the LSTM layer L2 into the attention mechanism layer A2 as a query during a decoding process, using the output of the multi-headed self-attention mechanism layer as the key and value pair of the attention mechanism layer A2, and using the output of the LSTM layer L2 and the periodic information together as the key and value pair of the attention mechanism layer A3, at the same time, using the back segment series of the sample series as a query of the attention mechanism layer A3, the output of the attention mechanism layer A3 is the final prediction result of the model; finally, the loss function between the prediction result and the lable series is calculated. According to the loss function, the model parameters are backpropagated and updated by using the subgradient method, and the iterative update is continued accordingly until the loss function converges and reaches the minimum value, or reaches the maximum number of iterations, that is, the training is completed.

Furthermore, the expression of the loss function is as follows:

$$\text{Loss}(X_{target}, \tilde{X}_{pred}) = \max_{t \in T}(X_{target}[t] - \tilde{X}_{pred}[t])^2$$

wherein, $\text{Loss}(X_{target}, \tilde{X}_{pred})$ is the loss function between the $X_{target}$ and $\tilde{X}_{pred}$, $X_{target}$ is the label series, $\tilde{X}_{pred}$ is the model prediction result, t is the time, $X_{target}[t]$ is the load usages of the server at time t in the label series, $\tilde{X}_{pred}[t]$ is the load usages of the server at time t in the model prediction result.

The present invention provides a method for improving the accuracy of neural network prediction by combining periodic information, long-term trend information, and short-term time series information, and demonstrates superiority over traditional methods in the peak load section. The method of the present invention can effectively improve prediction accuracy, provide more accurate scheduling and evacuation decision-making basis for cloud service providers, thereby reducing the redundant equipment required to ensure high reliability, reducing the operating costs of cloud service providers, and reducing the rental expenses of cloud service tenants.

DETAILED DESCRIPTION OF THE INVENTION

In order to provide a more specific description of the present invention, the following will provide a detailed explanation of the technical solution of the present invention in conjunction with the accompanying drawings and specific implementation methods.

The server load prediction method based on deep learning of the present invention comprises the following steps:
(1) In a Test Set, Calculating a Period Length by Using an Autocorrelation Coefficient.

setting the server load series length to n, and at the i-th moment, the value of the server load is $X_i$.

Firstly, performing a sliding window average with a sliding window length of 100 for the server load series, i.e $$\forall i \in \{i \in N \mid 1 \leq i \leq n\}, \bar{X}_i = \frac{1}{100}\sum_{j=0}^{100} X_{i+j}.$$

Figure 1:
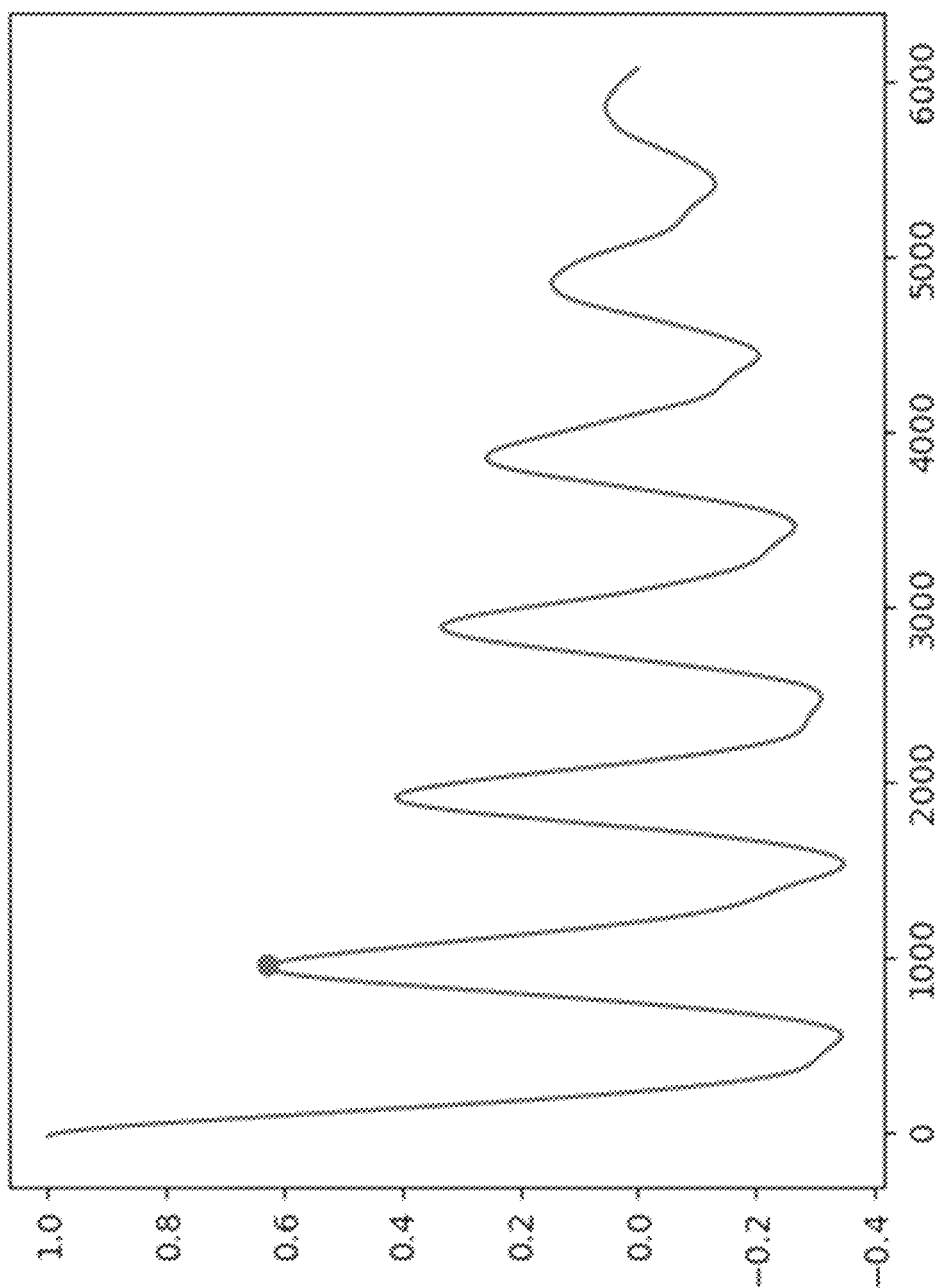
FIG. 1 shows the waveform diagram of the autocorrelation coefficient signal of the server load usage series.

Using the autocorrelation coefficient formula (1) to calculate the autocorrelation coefficient value series ac when $k \in \{k \in N \mid 1 \leq k \leq n\}$, as shown in FIG. 1, it can be seen that the autocorrelation of server load first decreases and then increases. The reason for the first decrease in autocorrelation is that as the time span increases, the correlation between data weakens; the reason for the increase in autocorrelation is due to the periodicity existed in the server load, if the period length is T, then $X_{T+k} \approx X_k$, therefore, as k approaches T continuously, the correlation increases; the length of a period is the k value when the autocorrelation coefficient rises again to the highest point, that is, finding a j that satisfies ac[j]>ac[j+1] and ac[j]>ac[j−1] within the interval of 2≤k≤n, wherein j is the period length T.

$$\rho_k = \frac{\text{Cov}(\overline{X_{t-k}}, \overline{X_t})}{\text{Cov}(\overline{X_t}, \overline{X_t})} \quad (1)$$

Using the period length T to intercept the substring with length T at the beginning of the load series, that is, the first period, denoted as $X_{Term}$, as an input to step (5).
(2) Using Sparse Self Attention Mechanism to Sample the Trend Changes of the Server Load Long Series.

Due to the long-term trend of server load, while short-term trend change may be masked by noise, traditional training models of time series such as LSTM and GRU often have the problem of forgetting when processing long sequence information, resulting in poor performance. Transformer's self attention mechanism has been proved to be effective in processing long series information, however, due to the time and space complexity of its series length quadratic, it has a large time and memory overhead when processing long series. Therefore, the present invention proposes a method for capturing long series trend information based on Down Sampling.

First, based on the recognition that the larger the time span, the smaller the contribution of historical load information to current load prediction in the same period, the denser the data sampling with small span, and the sparser the data sampling with large span. Therefore, the present invention uses an equal difference step size to downsample the historical load information starting from the current load, that is, setting the current time to t, recording the downsampling data as $\tilde{X}=\{X_{t-i}\}$ for $\forall i \in \{20, 21, 22, 23, 24 \ldots, 30\}\}$.

Figure 2:
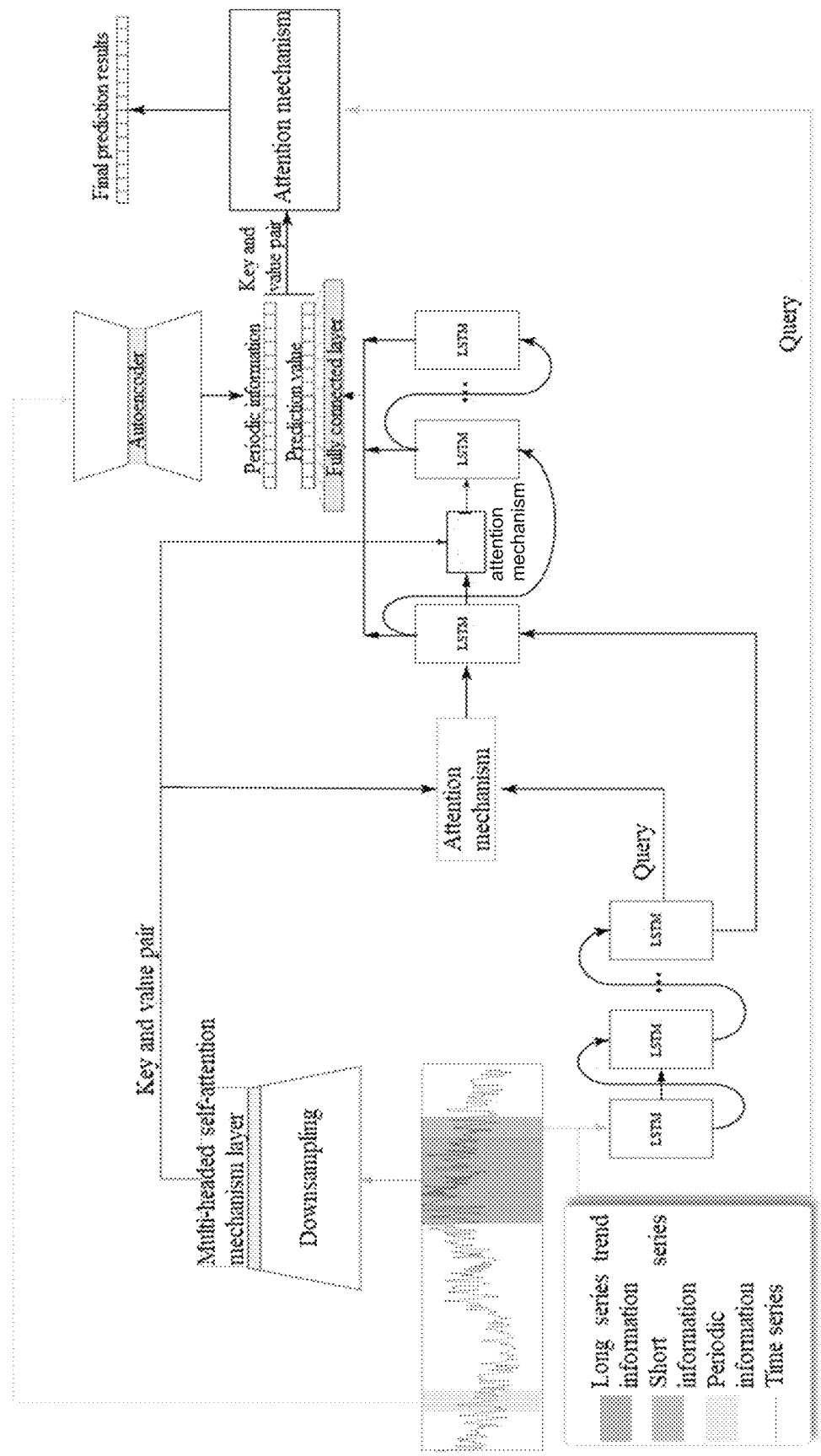
FIG. 2 is a schematic diagram of the neural network structure used in the present invention.

Using the self attention mechanism for the downsampling data $\tilde{X}$, as shown in FIG. 2, obtaining the processed downsampling data $\hat{X}$ as one of the inputs to the decoder in step (4).
(3) Using the LSTM Model to Process Server Load Short Series Information.

Inputting the first 30 data $X_{in}=\{X_{t-30}, X_{t-29}, \ldots, X_t\}$ as the short series into the LSTM layer of the encoder, and obtaining the hidden state (h, c) and output r of the last output of the LSTM, which are taken as inputs to step (4).
(4) Generating Prediction Series by Using the Encoder-Decoder Architecture.

Using the part described in steps (2) and (3) as the encoder, while the decoder is based on the LSTM model; as shown in FIG. 2, using the output r obtained from step (3) as the first input $i_0$ of the decoder LSTM, the input of each Decode is the output of the previous decoder LSTM. Using the hidden states h and c obtained in step (3) as two queries for the attention mechanism, and using the processed downsampling data $\hat{X}$ obtained in step (2) as the key and value of the attention mechanism, using the attention mechanism formula to obtain the results ḣ and ċ of queries h and c, respectively. Making ḧ=[h; ḣ], c̈=[c; ċ], where [ ] represents row concatenation. (h)"; C") is used as the initial implicit state of the decoder LSTM, and setting the length of ḣ is l, and the hidden state input for each subsequent decoding step is calculated as follows:

The hidden state $h_{t-1}$, $c_{t-1}$ decoded by the previous step is mapped to a vector $\tilde{h}_{t-1}=W_1 h_{t-1}$, $\tilde{c}_{t-1}=W_2 c_{t-1}$ with a length of l/2, wherein W is the model parameter. Taking $\tilde{h}_{t-1}$, $\tilde{c}_{t-1}$ as a query, and $\hat{X}$ as the key and value, using the attention mechanism formula (2), wherein Q is the query vector, K is the key vector, and K is the value vector, obtaining the query result $\ddot{h}_{t-1}$, $\dot{c}_{t-1}$, taking $\ddot{h}_{t-1}=[h_{t-1}; \dot{h}_{t-1}]$, $\ddot{c}_{t-1}=[c_{t-1}; \dot{c}_{t-1}]$, $\ddot{h}_{t-1}, \ddot{c}_{t-1}$ is taken as the hidden state input of the current step.

$$\text{result} = softmax(Q^T K)V \qquad (2)$$

Using the output obtained from each decoding step in the above process as the prediction value series $\tilde{X}=\{\tilde{X}_{t+1}, \tilde{X}_{t+2}, \ldots, \tilde{X}_{t+plen}\}$, wherein plen is a hyperparameter for representing the prediction length, $\tilde{X}_i$ represents the load at the prediction i-th moment.

(5) The Attention Mechanism is Used to Linear Addition the Prediction Value and Periodic Information in Step (4).

Using MSE as a series distance metric, as shown in formula (3), wherein $X_1$, $X_2$ is a time series of length n, finding the substring $X_{match}=\{X_j, \ldots, X_{j+30}\}$ in the period reference information $X_{Term}$ captured in step (1), with the minimum MSE distance from $X_{in}$ in step (3) by using a sliding window, then the current prediction value in the period reference information corresponds to $X_{pred}=\{X_{j+30+1}, \ldots, X_{j+30+plen}\}$. Due to the coexistence of periodicity and suddenness in the service load, the present invention uses the attention mechanism to determine what extent do you trust the periodic information $X_{pred}$, and the prediction information $\tilde{X}$ decoded by the decoder; when using the attention mechanism, the present invention incorporates $X_{pred}, \tilde{X}$ as a query, $X_{pred}, \tilde{X}$ as the key and value, using the attention mechanism formula (2) to obtain the final prediction result $\tilde{X}_{pred}$.

$$MSE(X_1, X_2) = \frac{1}{n}(X_1 - X_2)^2 \qquad (3)$$

(6) Modifying the Loss Function to Optimize the Load Prediction at the Peak.

Due to the uneven distribution of peak and non-peak data in the training data, peak data accounts for about 36% and non-peak data accounts for about 64%. Peak data is the main factor causing service defaults by cloud service providers and has higher value sensitivity. Therefore, the present invention designs a new loss function to correct the prediction error of peak data, and the prediction target value is $X_{target}$, the model prediction is $\tilde{X}_{pred}$, the time interval of prediction target value is T, then the loss function is:

$$\text{Loss}(X_{target}, \tilde{X}_{pred}) = \max_{t \in T}(X_{target}[t] - \tilde{X}_{pred}[t])^2 \qquad (4)$$

Due to the non-smoothness of the maximum function, it is not possible to directly derive during the backpropagation process, therefore, the present invention uses a subgradient method for backpropagation.

$$f(x_1, x_2, \ldots, x_n) = \max_{i \in (1,n)} x_i, g_i(X_{in}, X_{target}) = (\tilde{X}_{pred}(X_{in})[i] - X_{target}[i])^2,$$

then the loss function of step (4) can be expressed as:

$$\text{Loss}(X_{target}, \tilde{X}_{pred}) = f(g_1(X_{in}, X_{target}), \ldots, g_n(X_{in}, X_{target})) \qquad (5)$$

The subgradient of the loss function is:

$$\partial f(g(X_{in})) = \partial f \partial g = \partial g_{max}(X_{in}, X_{target}), \text{ wherein,}$$

$$g_{max} = \underset{g_i, i \in (1,n)}{\text{argmax}} g_i(X_{in}, X_{target}) \circ$$

In this embodiment, in a service cluster, tools such as strace or vtune are used to detect and collect real-time CPU and memory usage information of each server in the current cluster. The model first calculates the period length of the server load series and intercepts the first period of the load series as a reference for period information; starting from the second series, a sliding window mechanism is used to intercept tlen loads each time as input data for the model, and plen loads are used as the prediction target value $X_{target}$.

The above description of the embodiments is for the convenience of ordinary technical personnel in the art to understand and apply the present invention. Those familiar with the art can clearly make various modifications to the above embodiments and apply the general principles explained here to other embodiments without the need for creative labor. Therefore, the present invention is not limited to the aforementioned embodiments. According to the disclosure of the present invention, the improvements and modifications made by those skilled in the art should be within the scope of protection of the present invention.

The invention claimed is:

1. A server load prediction method based on deep learning, comprising the following steps:
   (1) collecting a load usages series of the server in a past time and dividing it into a sample series and a label series;
   (2) extracting periodic information of the load usages series;
   (3) establishing a periodic information adaptive model based on encoder-decoder architecture;
   (4) inputting the sample series, the label series, and the periodic information into the model for training;
   (5) inputting the load usages series of the server in the current time segment into the trained model, the load usages series of the server in the future time segment can be predicted and output;
   wherein, a specific implementation method of step (1) is as follows:
   dividing the load usages series of the server in the past time into two segments, with the load usages series of the previous time segment as the sample series and the load usages series of the later time segment as the label series, and the data proportion of the previous time segment is greater than that of the later time segment;
   wherein, a specific implementation method of step (2) is as follows:
   for the load usages series of the server in the past time segment, an autocorrelation coefficient signal of the series is first calculated, and an abscissa value corresponding to the second peak of the autocorrelation coefficient signal is taken as a period length T, and the abscissa value represents the time interval length;
   then, taking the load usages series of the T time length before the label sequence as the periodic information;
   wherein, the periodic information adaptive model is comprised of an encoder module connected with a decoder module, the encoder module comprises a downsampling layer, a multi-headed self-attention mechanism layer, and a LSTM (Long Short Term Memory, Long short-term memory Network) layer L1, the decoder module comprises of a LSTM layer L2 and three attention mechanism layers A1~A3;

wherein, a specific implementation method of step (4) is as follows:

first, dividing the sample series into two segments with the front segment series being longer than the back segment series, inputting the front segment series into the downsampling layer for downsampling, and inputting the downsampling result into the multi-headed self-attention mechanism layer;

inputting the back segment series into the LSTM layer L1, inputting the hidden state of the LSTM layer L1 into the attention mechanism layer A1 as a query, and using the output of the multi-headed self-attention mechanism layer as the key and value pair of the attention mechanism layer A1, the output of the attention mechanism layer A1 is used as the initial hidden state of the LSTM layer L2, and the output of the LSTM layer L1 is used as the input of the LSTM layer L2;

the decoder module needs to input the previous hidden state of the LSTM layer L2 into the attention mechanism layer A2 as a query during a decoding process, using the output of the multi-headed self-attention mechanism layer as the key and value pair of the attention mechanism layer A2, and using the output of the LSTM layer L2 and the periodic information together as the key and value pair of the attention mechanism layer A3, at the same time, using the back segment series of the sample series as a query of the attention mechanism layer A3, the output of the attention mechanism layer A3 is the final prediction result of the model;

finally, the loss function between the prediction result and the label series is calculated;

according to the loss function, the model parameters are backpropagated and updated by using the subgradient method, and the iterative update is continued accordingly until the loss function converges and reaches the minimum value or reaches the maximum number of iterations, that is, the training is completed;

wherein, the expression of the loss function is as follows:

$$\text{Loss}(X_{target}, \tilde{X}_{pred}) = \max_{t \in T}(X_{target}[t] - \tilde{X}_{pred}[t])^2$$

wherein, Loss($X_{target}$, $\tilde{X}_{pred}$) is a loss function between the $X_{target}$ and $\tilde{X}_{pred}$, $X_{target}$ is the label series, $\tilde{X}_{pred}$ is the model prediction result, t is the time, $X_{target}[t]$ is the load usages of the server at time t in the label series, $\tilde{X}_{pred}[t]$ is the load usages of the server at time t in the model prediction result.

2. The server load prediction method according to claim 1, wherein, the server load targets the CPU or memory resources of the server.

* * * * *